US006284034B1

(12) United States Patent
Hiorns et al.

(10) Patent No.: US 6,284,034 B1
(45) **Date of Patent: *Sep. 4, 2001**

(54) PIGMENT MATERIALS AND THEIR USE IN COATING COMPOSITIONS

(75) Inventors: Anthony Gordon Hiorns; Janet Susan Preston, both of Cornwall (GB); James Philip Eynon Jones, Alpharetta, GA (US)

(73) Assignee: Imerys Minerals Limited, Cornwall (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/354,636

(22) Filed: Jul. 16, 1999

Related U.S. Application Data

(60) Provisional application No. 60/093,201, filed on Jul. 17, 1998.

(51) Int. Cl.[7] .............................. C09C 1/02; C09C 1/42; C09C 1/28; C09C 1/36; C09D 1/00

(52) U.S. Cl. .......................... 106/486; 106/415; 106/416; 106/417; 106/436; 106/442; 106/464; 106/469; 106/467; 106/468; 106/487; 106/482; 106/483; 106/461

(58) Field of Search .................................... 106/400, 415, 106/416, 417, 436, 442, 449, 461, 464, 469, 465, 467, 468, 486, 487, 482, 483; 162/181.1, 181.3, 181.6, 181.8

(56) References Cited

U.S. PATENT DOCUMENTS

| | | | | |
|---|---|---|---|---|
| 3,940,550 | * | 2/1976 | Delfosse et al. | 106/464 |
| 4,898,620 | * | 2/1990 | Rayfield et al. | 106/464 |
| 5,120,365 | * | 6/1992 | Kogler | 106/464 |
| 5,454,865 | * | 10/1995 | Ginn et al. | 106/484 |
| 5,478,388 | * | 12/1995 | Gane et al. | 106/464 |
| 5,605,568 | * | 2/1997 | Naydowski et al. | 106/464 |
| 5,882,396 | * | 3/1999 | Hiorns | 106/461 |
| 6,074,474 | * | 6/2000 | Broome et al. | 106/464 |

* cited by examiner

*Primary Examiner*—Michael Marcheschi
(74) *Attorney, Agent, or Firm*—Finnegan, Henderson, Farabow, Garrett & Dunner, L.L.P.

(57) ABSTRACT

A pigment material for use in a coating composition suitable for coating a sheet material to be printed by an electrophotographic printer which pigment material comprises a blend of Components A and B as follows:

Component A: a fine pigment material suitable for gloss coating of a sheet material the pigment material comprising particles at least 80% by weight of which have an equivalent spherical diameter ("esd") of less than 2 $\mu$m and having a particle size distribution ("psd") such that its $d_{50}$ value, namely the particle esd value less than which 50% of the particles have an esd, is less than 1 $\mu$m; and Component B: a coarse pigment material having a psd such that its $d_{50}$ value is from 2 $\mu$m to 10 $\mu$m, desirably 2 $\mu$m to 5 $\mu$m and such that not more than 2% by weight of the particles of the coarse pigment material have an esd greater than 15 $\mu$m, desirably not more than 2% have an esd greater than 10 $\mu$m;

wherein the weight ratio of Component A to Component B is at least 4:1.

8 Claims, No Drawings

PIGMENT MATERIALS AND THEIR USE IN COATING COMPOSITIONS

This application claims priority from U.S. Provisional Application No. 60/093,201, filed Jul. 17, 1998.

BACKGROUND OF THE INVENTION

The present invention relates to pigment materials and their use in coating compositions.

Pigment materials such as calcium carbonate and calcined kaolin are employed together with hydrophilic binders such as acrylic and styrene butadiene latices and optionally other ingredients in compositions to coat paper and like materials to provide amongst other things smooth or gloss surfaces which can be printed upon.

Such printing may be carried out using an electrophotographic printer. Dry toner particles providing print information are applied to the coated paper surface by a fuser of a fuser station of such a printer. The toner particles incorporate a thermo-softening polymer and the fuser causes the polymer partially to melt and thereby causes the toner particles to adhere to the surface to be printed. The binders employed in coating compositions may have a relatively low glass transition temperature, eg less than 40° C., and the heat applied by the fuser can cause the binder of the coating composition providing the surface to be printed upon to become soft and sticky. The heat applied may be sufficient that when the printed sheets are stacked or reeled into multiple layers adjacent sheets or layers may adhere together. This can cause later paper handling and/or feeding problems which are of concern to the paper printer.

SUMMARY OF THE INVENTION

According to the present invention in a first aspect there is provided a pigment material for use in a coating composition suitable for coating a sheet material to be printed by an electrophotographic printer which pigment material comprises a blend of Components A and B as follows:

Component A: a fine pigment material suitable for gloss coating of a sheet material the pigment material comprising particles at least 80% by weight of which have an equivalent spherical diameter ("esd") of less than 2 μm and having a particle size distribution ("psd") such that its $d_{50}$ value, namely the particle esd value less than which 50% of the particles have an esd, is less than 1am; and Component B: a coarse pigment material having a psd such that its $d_{50}$ value is from 2 μm to 10 μm and such that not more than 2% by weight of the particles of the coarse pigment material have an esd greater than 15 μm;

wherein the weight ratio of Component A to Component B is at least 4:1.

DESCRIPTION OF THE INVENTION

In this specification all pigment psd measurements are as measured in a well known manner by sedimentation of the pigment in a fully dispersed condition in an aqueous medium using a SEDIGRAPH 5100 machine as supplied by Micromeritics Corporation. Such a machine provides measurements and a plot of the cumulative percentage by weight of particles having an esd less than given esd values. From the results obtained using a SEDIGRAPH 5100 machine, a histogram may be constructed of the percentage by weight of particles having an esd within each esd increment in a series of esd increments plotted along one axis. The esd vales of the mid-points of the esd increments plotted in this way may themselves conveniently be on a logarithmic scale. Such a histogram is referred to herein as a "log-normal particle size increment histogram". An example of such a histogram is FIG. 1 of Assignee's EP-A-0,777,014.

In the pigment according to the first aspect of the invention, the weight ratio of Component A to Component B may be from 4:1 to 100:1, especially from 20:1 to 100:1.

Component A may have a $d_{50}$ value of from 0.4 μm to 0.7 μm. Preferably, not more than 2% by weight of the articles of Component A have an esd of 5 μm or more. At least 90% of the particles of Component A may have an esd less than 2 μm. In some examples of Component A at least 90% by weight of the particles of Component A may have an esd less than lm. Component A may have, on a log-normal particle size increment histogram (as referred to earlier), a histogram peak which at half peak maximum height has a width of from 1.0 to 1.2 along the esd logarithmic scale.

Preferably, not more than 2%, desirably not more than 1% by weight of the particles of Component B have an esd of 10 μm or more. Desirably, the $d_{50}$ value of Component B is from 2 μm to 5 μm. Preferably, the particles of Component B are near spherical in shape.

Blending of Component B together with Component A to form the pigment material according to the first aspect of the invention provides a so-called bimodal particle size distribution wherein a secondary peak is seen in the psd in the range 2 μm to 10 μm, desirably in the range 2 μm to 5 μm, especially when a particle size increment histogram, as described earlier, is constructed.

The pigment material according to the first aspect of the invention when employed in a coating composition helps to provide 'anti-blocking', ie to deter or prevent the adhesion between coated layers described earlier. The minor amount of coarse pigment particles present in the coating composition, provided by Component B of the pigment material according to the invention, beneficially causes the coated surface to have localised points of protrusion in the surface profile although surprisingly not substantially reducing the overall surface gloss or substantially harming other properties as illustrated later. These points of protrusion serve to reduce the area of contact between adjacent coated sheets or layers and therefore allow the adjacent sheets or layers to be more easily separated.

The pigment material according to the first aspect should have a psd suitable for use in a paper coating composition to be applied by paper coating machinery, especially modern fast paper coating machinery, without known blade runnability problems such as giving rise to so-called spits, streaks or blade bleeding obtained with certain inferior coating compositions.

The pigment material employed to provide Component A and that employed to provide Component B may each independently be selected from any one or more of the materials known for use in paper coating compositions. Such material may for example comprise one or more (materials having the required particle size properties) of calcium carbonate (synthetic, precipitated material or ground from naturally occurring mineral), calcined kaolin, hydrous kaolin, talc, mica, dolomite, silica, zeolite, gypsum, satin white, titania, calcium sulphate and plastic pigment. Preferably both Component A and Component B are selected from calcium carbonate and calcined kaolin, eg both may be calcium carbonate.

According to the present invention in a second aspect there is provided an aqueous coating composition suitable for coating a sheet material to be printed by an electrophotographic printer which comprises a pigment material according to the first aspect together with a hydrophilic adhesive and optionally other ingredients.

According to the present invention in a third aspect a method of printing paper sheets by an electrophotograhic printing process includes the step of carrying out the printing on coated sheets of the paper wherein the sheets have been coated with a coating composition according to the second aspect.

The sheets which have been printed upon may subsequently be stacked or wound on a reel and may be subsequently re-handled without substantial adhesion between adjacent layers or sheets.

The amount of adhesive or binder present in the coating composition according to the second aspect depends upon whether the composition is to be applied as a relatively dilute or concentrated pigment-containing suspension to the material to be coated. For example, a dilute pigment-containing composition (binder-rich composition) could be employed as a top-coat for underlying more pigment-rich compositions. The adhesive or binder present in the composition may range from 1% to 70% by weight relative to the dry weight of pigment (100% by weight) especially 4% to 50% by weight. Where coating composition is not to be employed as a binder rich composition the adhesive or binder may form from 4% to 30%, eg 8% to 20%, especially 8% to 15% by weight of the solids content of the composition. The amount employed will depend upon the composition and the type of adhesive, which may itself incorporate one or more ingredients. For example, the following adhesive or binder ingredients may be used in the following stated amounts:

(a) Latex: levels range from 4% by weight for self thickening gravure latices to 20% by weight for board coating latices. The latex may comprise for example a styrene butadiene, acrylic latex, vinyl acetate latex, or styrene acrylic copolymers.

(b) Starch and other binders: levels range from 0 to 50% by weight, eg 4% by weight to 20% by weight for pigment-rich compositions. The starch may comprise material derived from maize, corn and potato. Examples of other binders include other polysaccharide or proteinaceous adhesives, casein and polyvinyl alcohol.

Additives in various known classes may, depending upon the type of coating and material to be coated, be included in the coating composition according to the second aspect of the present invention. Examples of such classes of optional additive are as follows:

(a) Cross linkers: eg in levels 0 to 5% by weight; for example glyoxals, melamine formaldehyde resins, ammonium zirconium carbonates.

(b) Water retention aids: eg in up to 2% by weight, for example sodium carboxymethyl cellulose, hydroxyethyl cellulose, PVA (polyvinyl acetate), starches, proteins, polyacrylates, gums, alginates, polyacrylamide bentonite and other commercially available products sold for such applications.

(c) Viscosity modifiers or thickeners: eg in levels up to 2% by weight; for example polyacrylates, emulsion copolymers, dicyanamide, triols, polyoxyethylene ether, urea, sulphated castor oil, polyvinyl pyrrolidone, montmorillonite, CMC (carboxymethyl celluloses), sodium alginate, xanthan gum, sodium silicate, acrylic acid copolymers, HMC (hydroxymethyl celluloses), HEC (hydroxyethyl celluloses) and others.

(d) Lubricity/Calendering aids: eg in levels up to 2% by weight, for example calcium stearate, ammonium stearate, zinc stearate, wax emulsions, waxes, alkyl ketene dimer, glycols.

(e) Dispersants: eg in levels up to 2 per cent by weight, for example polyelectrolytes such as polyacrylates (sodium and ammonium), sodium hexametaphosphates, non-ionic polyol, polyphosphoric acid, condensed sodium phosphate, non-ionic surfactants, alkanolamine and other reagents commonly used for this function.

(f) Antifoamers/defoamers: eg in levels up to 1% by weight, for example blends of surfactants, tributyl phosphate, fatty polyoxyethylene esters plus fatty alcohols, fatty acid soaps, silicone emulsions and other silicone containing compositions, waxes and inorganic particulates in mineral oil, blends of emulsified hydrocarbons and other compounds sold commercially to carry out this function.

(g) Dry or wet pick improvement additives: eg in levels up to 2% by weight, for example melamine resin, polyethylene emulsions, urea formaldehyde, melamine formaldehyde, polyamide, calcium stearate, styrene maleic anhydride and others.

(h) Dry or wet rub improvement and abrasion resistance additives: eg in levels up to 2i by weight, for example glyoxal based resins, oxidised polyethylenes, melamine resins, urea formaldehyde, melamine formaldehyde, polyethylene wax, calcium stearate and others.

(i) Gloss-ink hold-out additives: eg in levels up to 2% by weight, for example oxidised polyethylenes, polyethylene emulsions, waxes, casein, guar gum, CMC, HMC, calcium stearate, ammonium stearate, sodium alginate and others.

(j) Optical brightening agents (OBA) and fluorescent whitening agents (FWA): eg in levels up to 1% by weight, for example stilbene derivatives.

(k) Dyes: eg in levels up to 0.5% by weight.

(l) Biocides/spoilage control agents: eg in levels up to 1% by weight, for example metaborate, sodium dodecylbenene sulphonate, thiocyanate, organosulphur, sodium benzonate and other compounds sold commercially for this function eg the range of biocide polymers sold by Calgon Corporation.

(m) Levelling and evening aids: eg in levels up to 2% by weight, for example non-ionic polyol, polyethylene emulsions, fatty acid, esters and alcohol derivatives, alcohol/ethylene oxide, sodium CMC, HEC, alginates, calcium stearate and other compounds sold commercially for this function.

(n) Grease and oil resistance additives: eg in levels up to 2% by weight, eg oxidised polyethylenes, latex, SMA (styrene maleic anhydride), polyamide, waxes, alginate, protein, CMC, HMC.

(o) Water resistance additives: eg in levels up to 2% by weight, eg oxidised polyethylenes, ketone resin, anionic latex, polyurethane, SMA, glyoxal, melamine resin, urea formaldehyde, melamine formaldehyde, polyamide, glyoxals, stearates and other materials commercially available for this function.

(p) Insolubiliser: eg in levels up to 2% by weight.

For all of the above additives, the percentages by weight quoted are based on the dry weight of pigment (100%) present in the composition. Where the additive is present in a minimum amount the minimum amount may be 0.01% by weight based on the dry weight of pigment.

The paper sheets coated by the coating composition according to the second aspect may comprise any of the paper compositions which are known to be useful for coating, especially by electrophotography. Such compositions will comprise a mixture of cellulose fibres plus fillers.

The paper sheets which are coated using the coating composition according to the second aspect of the invention may be uncoated or they may carry one or more previously applied coating layers. The previously applied coating layer, if present, beneath the coating using the composition according to the invention may serve to improve thermal insulation between the outer surface which is to be thermally printed upon and the inner paper structure. The previously applied coating layer may comprise for example calcined kaolin, hydrous kaolin or calcium carbonate.

Methods of coating paper and other sheet materials are widely published and well known. For example, there is a review of such methods published in Pulp and Paper International, May 1994, page 18 et seq. Sheets may be coated on the sheet forming machine, ie "on-machine", or "off-machine" on a coater or coating machine. Use of high solids compositions is desirable in the coating method because it leaves less water to evaporate subsequently. However, as is well known in the art, the solids level should not be so high that high viscosity and levelling problems are introduced.

All known methods of coating for use in coating paper using the coating composition according to the second aspect of the present invention require (i) a means of applying the coating composition to the material to be coated, viz an applicator; and (ii) a means for ensuring that a correct level of coating composition is applied, viz a metering device. When an excess of coating composition is applied to the applicator, the metering device is downstream of it. Alternatively, the correct amount of coating composition may be applied to the applicator by the metering device, eg as a film press. At the points of coating application and metering, the paper web support ranges from a backing roll, eg via one or two applicators, to nothing (ie: just tension). The time the coating is in contact with the paper before the excess is finally removed is the dwell time—and this may be short, long or variable.

The coating is usually added by a coating head at a coating station. According to the quality desired, paper grades are uncoated, single coated, double coated and even triple coated. When providing more than one coat, the initial coat (precoat) may have a cheaper formulation. A coater that is applying a double coating, ie a coating on each side of the paper, will have two or four coating heads, depending on the number of sides coated by each head. Most coating heads coat only one side at a time, but some roll coaters (eg film press, gate roll, size press) coat both sides in one pass.

Examples of known coaters which may be employed in coating of a sheet material using a composition according to the second aspect of the invention include air knife coaters, blade coaters, rod coaters, bar coaters, multi-head coaters, roll coaters, roll/blade coaters, cast coaters, laboratory coaters, gravure coaters, kiss coaters, liquid application systems, reverse roll coaters and extrusion coaters.

Embodiments of the present invention will now be described by way of example with reference to the following Examples.

DESCRIPTION OF SPECIFIC EMBODIMENTS OF THE INVENTION

EXAMPLE 1

Various pigment suspensions were prepared using the following pigment materials:

P1: a commercially available fine calcined clay coating pigment;

P2: a commercially available finely ground coating calcium carbonate;

P3: another commercially available finely ground coating calcium carbonate;

P4: a coarser ground calcium carbonate pigment;

P5: a coarser hydrous kaolin pigment;

P6: P2 (90% by weight) plus P4 (10% by weight)

P7: P2 (90% by weight) plus P5 (10% by weight)

P8: P3 (90% by weight) plus P4 (10% by weight)

P9: P1 (90% by weight) plus P4 (10% by weight)

The particle size distributions of commercially available pigments P1 to P3 are shown in Table 1 as follows.

TABLE 1

| % by weight of particles having a specified esd (μm) | Pigment P1 | P2 | P3 |
|---|---|---|---|
| >10 | 0.03 | 0.06 | 0.7 |
| >5 | 0.1 | 0.2 | |
| <2 | 99 | | 95 |
| <1 | 99 | 85 | 79 |
| <0.5 | 93 | 55 | 35 |
| <0.25 | 64 | 30 | 13 |

The $d_{50}$ values (mean particle size) for the pigments P1 to P5 are shown in Table 2 as follows.

TABLE 2

| | Pigment P1 | P2 | P3 | P4 | P5 |
|---|---|---|---|---|---|
| $d_{50}$ (μm) | 0.2 | 0.44 | 0.7 | 3.2 | 3.5 |

Coating compositions were prepared by mixing 10l by weight of (50% active) Dow 950 latex binder separately with each of pigments Pl-P3 and P6-P9. The solids were thoroughly stirred in each case after which the slurry solids content was diluted to 67% by weight by addition of water and the pH in each case was adjusted to about 8.5 by addition of NaOH.

The Brookfield viscosity of each slurry produced was measured in a well known manner at 22° C.

In Table 3 as follows the viscosity measurements obtained are given. Compositions C1–C3 contain pigments P1–P3 and compositions C4–C7 contain pigments P6–P9 respectively.

TABLE 3

| Brookfield spindle speed (rpm) | Composition C1 | C2 | C3 | C5 | C6 | C7 |
|---|---|---|---|---|---|---|
| 10 | 1400 | 600 | 300 | 600 | 200 | 800 |
| 20 | 900 | 450 | 200 | 450 | 200 | 500 |
| 50 | 520 | 320 | 120 | 320 | 120 | 280 |
| 100 | 360 | 230 | 110 | 220 | 110 | 200 |

Table 3 shows that the viscosity of coating compositions to which a coarse pigment P4 or P5 is added (10%) are not deleteriously affected by the coarse pigment addition.

Calendered coated papers were produced by coating sheets of the commercially available base paper Nymolla 390 from Stora. This is a pre-coated wood free paper. Sheets were coated with various weights of compositions C1 to C7 using a laboratory coating machine and the resulting sheets were calendered to give a target gloss of 65% measured at an angle of 75°. Coated sheets having the required gloss were prepared from all of the compositions C1 to C7. The required coat weight was about $6g.m^{-2}$. Gloss in each case could be increased by increasing the coat weight.

Brightness, opacity, yellowness and whiteness of the gloss sheets were measured for sheets made from each of C1 to C7 using standard TAPPI procedures.

Addition of coarse pigment P4 to fine pigments P1 and P3 to give compositions C7 and C6 caused no appreciable difference in brightness, opacity, yellowness and whiteness compared to the corresponding compositions C1 and C3 with no coarse pigment added.

Addition of coarse pigment P4 or P5 to fine pigment P2 caused a slight but acceptable fall in brightness, opacity and a slight but acceptable rise in yellowness compared with the corresponding composition C2 with no coarse pigment added.

Thus, generally addition of 10% by weight of P4 or P5 to P1, P2 or P3 does not seriously affect the optical properties of 65% gloss sheets made from such pigment blends.

The anti-blocking properties of the gloss sheets made from the blend compositions C4–C7 containing 10% by weight of coarse pigment (P4 or P5) were found to be improved compared with the compositions C1–C3 made from the commercially available fine pigments P1–P3. As an example, the micro-roughness of sheets made from compositions C1 (pigment P1) and C7 (pigment P1 plus 10% P4) were compared using a gloss photogoniometer using the method described in 'The specular reflection of polarised light from coated paper' by Gate, L F and Parsons, D J, Products of Papermaking, Trans of the $_{10}$th Fund Research Symp, Oxford 1993, page 263. In this method, the intensity of reflected light is measured as a function of angular position on both sides of the specular angle. The light is polarised (He—Ne) laser light. The coated paper sample is mounted vertically and may be rotated about an axis perpendicular to the plane of incidence. A detector system collects angular distributed light reflected from the sample by rotating about the sample planar axis in the steps of 0.1° or smaller. The sample area illuminated is an ellipse 3 mm×1 mm with an incidence angle of 750. Uncorrelated microroughness is measured by determining the change in the detected peak height with specular angle at very small changes of incidence angle. The uncorrelated microroughness may be expressed as a single number, "Sigma", which is given by the following equation:

$$R=R_o.\exp-(4\pi.\sigma\cos\theta/\lambda)^2$$

where R is the incident intensity $R_o$ is the reflected intensity

θ is the angle of incidence

λ is the wavelength of incident light and σ is "Sigma" the roughness parameter (standard deviation of the surface microroughness) measured in μm.

The results obtained are shown in Table 4 as follows.

TABLE 4

| Composition | Sigma (μm) |
|---|---|
| C1 | 0.185 |
| C7 | 0.176 |

Table 4 shows that Composition C7 shows a lower micro-smoothness than the corresponding Composition C1 containing no coarse additive.

Finally, scanning electron microscope pictures of a coated sheet made from composition C7 (pigment P1 and 10 pigment P4) revealed areas on the surface of the sheet which are 2–4mm in size. These areas correspond to the presence of particles of the coarse, anti-blocking pigment P4 in the sheet. Corresponding pictures of a coated sheet made from composition C1 (P1 only) showed no such areas.

We claim:

1. A pigment material for use in a coating composition suitable for coating a sheet material to be printed by an electrophotographic printer which pigment material comprises a blend of Components A and B as follows:

Component A: a fine pigment material suitable for gloss coating of a sheet material the pigment material comprising particles at least 80% by weight of which have an equivalent spherical diameter ("esd") of less than 2 μm and having a particle size distribution ("psd") such that its $d_{50}$ value, namely the particle esd value less than which 50% of the particles have an esd, is less than 1 μm; and Component B: a coarse pigment material having a psd such that its $d_{50}$ value is from 2 μm to 10 μm and such that not more than 2% by weight of the particles of the coarse pigment material have an esd greater than 15 μm;

wherein the weight ratio of Component A to Component B is at least 4:1.

2. A pigment material as claimed in claim 1 and wherein the weight ratio of Component A to Component B is in the range 4:1 to 100:1.

3. A pigment material as claimed in claim 1 and wherein Component A has a $d_{50}$ value of from 0.4 μm to 0.7 μm.

4. A pigment material as claimed in claim 1 and wherein not more than 2% by weight of the particles of Component A have an esd of 5 μm or more.

5. A pigment material as claimed in claim 1 and wherein Component A has on a log-normal particle size increment histogram, a histogram peak which at half peak maximum height has a width of from 1.0 to 1.2 along the esd logarithmic scale.

6. A pigment material as claimed in claim 1 and wherein Component A and Component B each independently comprises one or more of calcium carbonate, calcined kaolin, hydrous kaolin, talc, mica, dolomite, silica, zeolite, satin white, titania, calcium sulphate or plastic pigment.

7. An aqueous coating composition suitable for coating a sheet material to be printed by an electrophotographic printer which comprises a pigment material according to claim 1 together with a hydrophilic adhesive.

8. A pigment material as claimed in claim 6 and wherein at least one of Component A or Component B comprises gypsum.

* * * * *